Patented July 20, 1926.

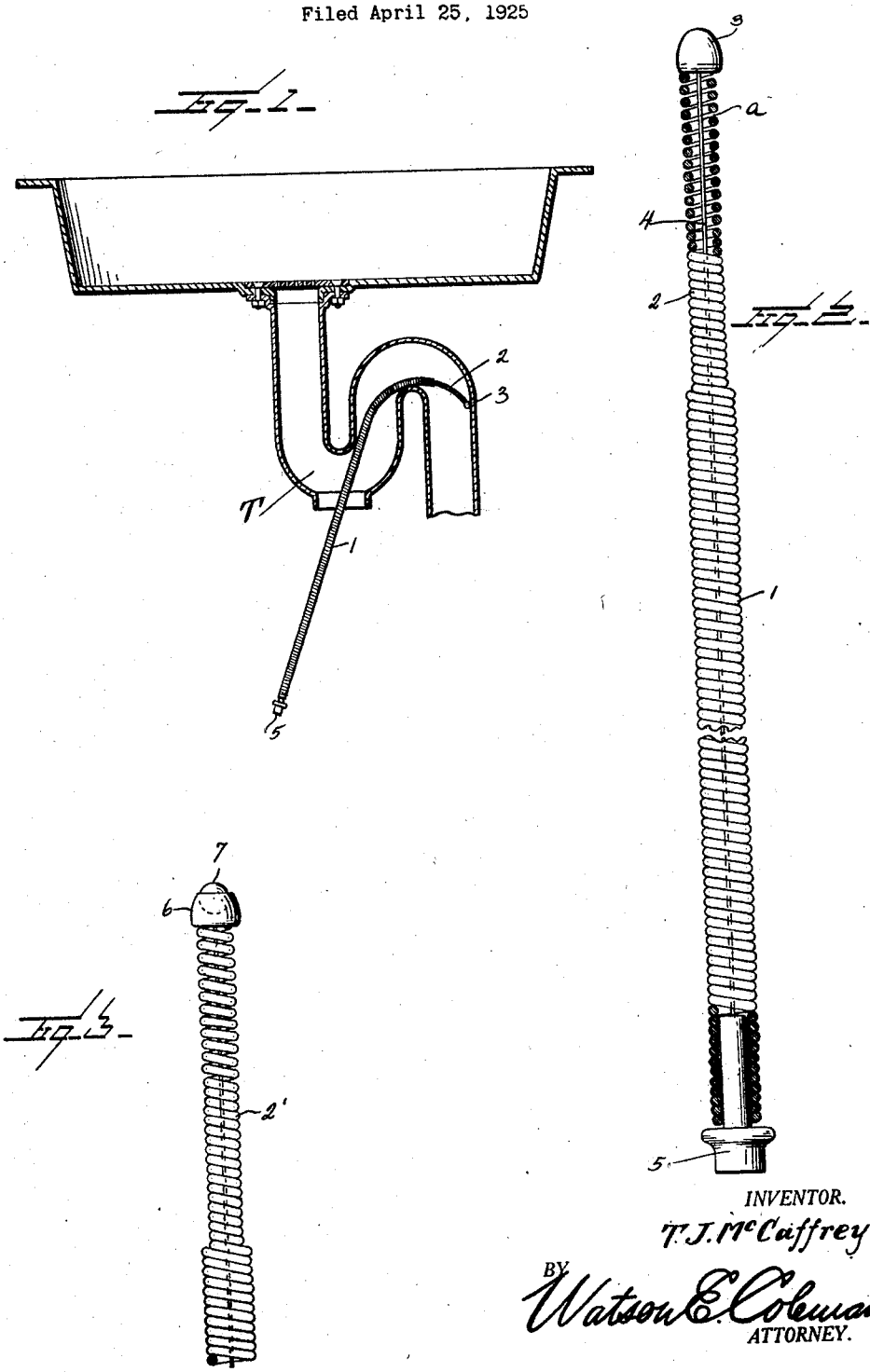

1,593,185

UNITED STATES PATENT OFFICE.

THOMAS J. McCAFFREY, OF SEATTLE, WASHINGTON.

PIPE-CLEANING IMPLEMENT.

Application filed April 25, 1925. Serial No. 25,343.

This invention relates to certain improvements in pipe cleaning implements and it is an object of the invention to provide a novel and improved device of this general character especially designed and adapted for use in opening up or forcing a passage through a waste pipe, sewer pipe or the like and particularly in connection with a grease clogged up or stopped up trap.

Another object of the invention is to provide a novel and improved implement of this general character which is non-expansive yet possesses sufficient pliability to permit the same to readily bend or flex to facilitate the implement working its way around the bends of a trap or the like and wherein the inserted end portion of the rod is provided with means to facilitate its use.

The invention consists in the details of construction and in the combination and arrangement of the several parts of my pipe cleaning implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better undersood, I will now proceed to describe the same with reference to the accompanying drawings, wherein:—

Figure 1 is a view partly in section and partly in elevation illustrating a pipe cleaning implement constructed in accordance with an embodiment of my invention and in working position;

Figure 2 is a view partly in elevation and partly in section of my improved implement as herein disclosed;

Figure 3 is a fragmentary elevational view illustrating a pipe cleaning implement constructed in accordance with a further embodiment of my invention.

My improved rod as herein disclosed comprises an elongated member 1 formed from a single strand of material coiled to provide a tubular body, adjacent coils being in close proximity one to the other. One end portion or extremity of the member 1 is of reduced diameter as indicated at 2 and the coils comprised in the outer or free end portion or extremity of said reduced portion 2 are spaced apart as at $a$ a distance greater than the spacing of the coils comprised in the inner portion of said extension 2. The extension 2 together with the additional spaced coils thereof are provided to permit the device when in use to pass through or around short turns in a pipe or trap whereby the operation of the implement is materially facilitated.

The outer end convolution of the extension 2 is permanently secured to a head 3 substantially spherical in form and also permanently secured to said head 3 is an extremity of a wire 4 of steel or brass. This wire or strand 4 extends through the member 1 and the extension 2 thereof and has its opposite end portion permanently secured to a head or block 5 positioned in close proximity to the adjacent end portion of the member 1. This wire or strand 4 serves, in connection with the head 3 and the head or block 5, to hold the member 1 and its extension 2 against expansion and thereby preventing the coils thereof from spreading apart and breaking.

In practice, the implement is adapted to be forced through a trap T or the like as illustrated in Figure 1 of the accompanying drawings and in a manner whereby a passage is opened up in said trap or the like and particularly when the same has become clogged with grease or otherwise stopped up. This operation can be readily accomplished by an inexperienced person and such operation is materially facilitated in view of the fact that the member 1 and its extension 2 is readily pliable yet possesses sufficient resistance to assure the accomplishment of the desired result.

When the implement is being forced through a waste pipe or the like, the head 3 upon contact with the wall of a trap or the like readily passes thereover and thereby assures the proper flexing or bending of the implement.

In the embodiment of my invention as illustrated in Figure 3, the outer end of the extension 2' is secured to a socket member 6 in which is mounted a ball 7, said ball having free rotation within the socket yet held by the socket against displacement. When the ball 7 is used the same readily rolls along the inner wall of the trap or the like with unhindered travel over any rough places which may be on such wall.

As is particularly illustrated in Figure 2, it is to be noted that the member 1 is entirely free from the head or block 5 so that when the cleaner is being forced or screwed into the waste pipe, the wire 4 will not twist and break.

While I have hereinbefore particularly stated that my improved implement is particularly designed for use in cleaning out traps or the like, it is to be understood that it may be employed with equal facility for other uses and that the implement may be of any desired length as the requirements of practice may necessitate.

From the foregoing description it is thought to be obvious that a pipe cleaning implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A pipe cleaning implement comprising a coiled spring, said spring having a portion of reduced diameter terminating in a spherical rotatable cleaning member, the coils nearest said cleaning member being spaced apart.

In testimony whereof I hereunto affix my signature.

THOMAS J. McCAFFREY.